M. F. YOUNG.
RESILIENT WHEEL.
APPLICATION FILED JUNE 21, 1913.
1,133,354.
Patented Mar. 30, 1915.
2 SHEETS—SHEET 1.
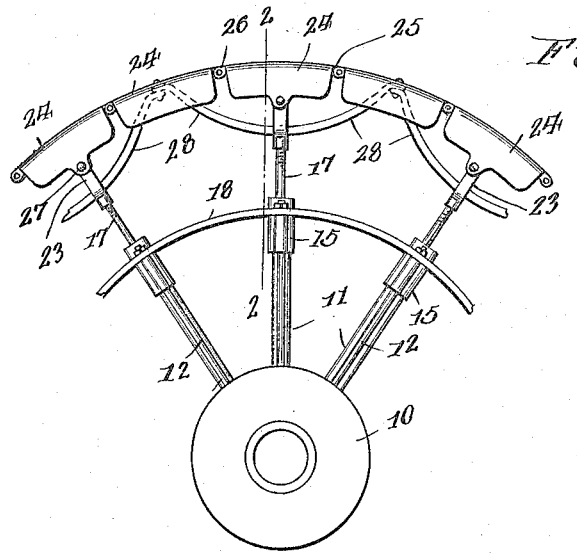
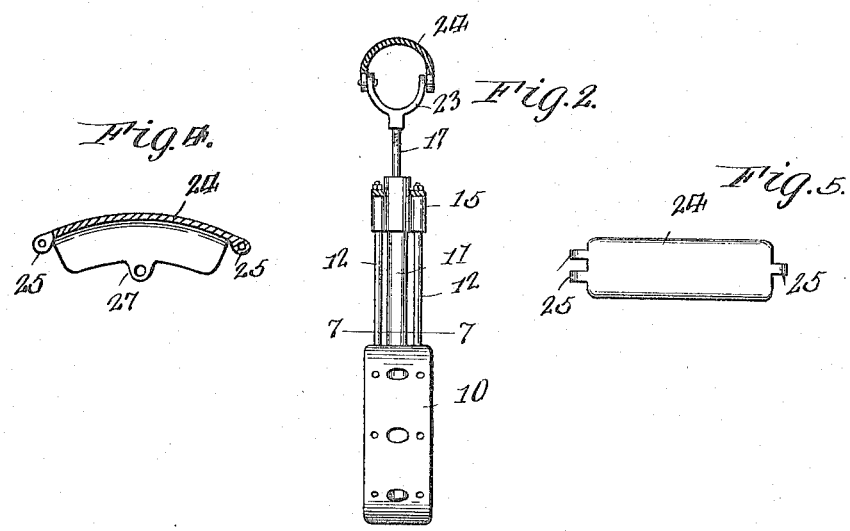
Witnesses
G. M. Spring.
B. F. Harvey Jr.
Inventor
Marion F. Young,
By Richard Beever
his Attorney M. F. YOUNG.
RESILIENT WHEEL.
APPLICATION FILED JUNE 21, 1913.
1,133,354.
Patented Mar. 30, 1915.
2 SHEETS—SHEET 2.
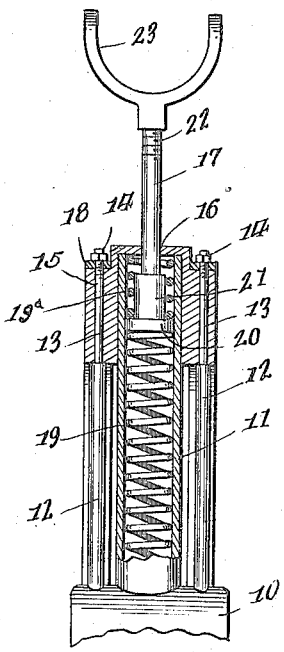
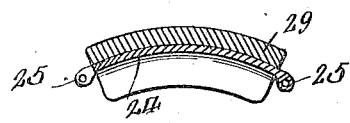
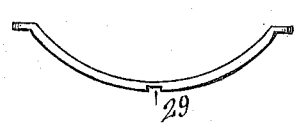
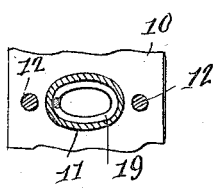
Witnesses
G. M. Spring.
B. F. Garvey Jr.
Inventor
Marion F. Young,
By Richard Eleven
his Attorney

UNITED STATES PATENT OFFICE.

MARION F. YOUNG, OF PLAINVIEW, TEXAS.

RESILIENT WHEEL.

1,133,354.

Specification of Letters Patent.

Patented Mar. 30, 1915.

Application filed June 21, 1913. Serial No. 775,069.

*To all whom it may concern:*

Be it known that I, MARION F. YOUNG, a citizen of the United States, residing at Plainview, in the county of Hale and State of Texas, have invented certain new and useful Improvements in Resilient Wheels, of which the following is a specification.

This invention relates to resilient wheels and has for its primary object to provide yielding spokes, which will absorb the shock when the tire comes in contact with road inequalities.

Another object of the invention resides in the provision of a peculiar formation of tire which is associated with the spokes in such a manner as to allow the tire to be flexed when contacting with road inequalities so as to be capable of the resiliency common to the pneumatic tires.

Other objects as well as the nature, characteristic features and scope of my invention will be more readily understood from the following description taken in connection with the accompanying drawings and pointed out in the claims forming a part of this specification.

Referring to the drawings:—Figure 1 is an elevation of a portion of a wheel constructed in accordance with my invention; Fig. 2 is a sectional view taken on the line 2—2 of Fig. 1; Fig. 3 is a sectional view of one of the cylinders disclosing the contents thereof; Fig. 4 is a longitudinal sectional view of one of the tread plates; Fig. 5 is a top plan view of the same; Fig. 6 is an elevation of one of the tread bracing elements; Fig. 7 is a cross sectional view taken on the line 7—7 of Fig. 2; and Fig. 8 is a longitudinal sectional view of a modified form of tread plate.

In the drawings wherein is shown the preferred form of my invention the numeral 10 represents a hub which is of the usual or any desired form and has radiating therefrom cylinders 11 which are preferably molded to the outer periphery of the hub and have extending upwardly in parallelism on each side thereof braces 12 which are preferably of a cylindrical configuration and have the outer ends thereof reduced and provided with screw-threads which are engaged by the nuts 14. The outer end of the cylinder 11 is open and has arranged thereover a cap or closure 15 which has formed centrally therein an aperture 16 through which a spoke 17 operates when pressure is exerted on the tire. The closure or cap 15 extends over the open end of the cylinder 11 and is sleeved over the reduced ends 13 of the brace elements 12. In order to hold the cap or closure 15 into engagement with the top of the cylinder 11, a ring 18 is provided which has apertures formed adjacent the opposite edges thereof through which the threaded ends of the reduced portions 13 are passed, said threaded ends being engaged by the nuts 14 so as to hold the ring 18 into engagement with the closure 15 for the purpose described.

Mounted within the cylinder 11 is a coil or spiral spring 19 which has the one end thereof in engagement with the periphery of the hub and the opposite end engaging the head 20 of the spoke 17. The head 20 has formed thereon an elongated shank 21 engaging over the inner end of the spoke 17 and rigidly secured thereto in any suitable manner. The outer end of the spoke 17 has formed thereon external screw-threads 22 which engage with the bifurcated detachable end 23 of the spoke, which is in connection with the tire.

Mounted between the head 20 and the outer end of each of the cylinders 11 is an auxiliary spring $19^a$ which is provided so as to prevent the shank 21 from coming in contact with the cylinder 11 after pressure is exerted from the tire, as would ordinarily be the case by the pressure of the shock absorbing spring 19 which is compressed when pressure is exerted on the tire.

The tire which is embodied in this invention comprises a plurality of successive plates 24 which are hinged together, the opposite ends of which are provided with corresponding eyes or knuckles 25 through which is passed a pivot pin 26 so as to hingedly engage one with the other. The plates 24 are substantially U-shaped in cross section and every second one thereof is provided with a pair of ears 27 one of which depends on each side of the plate for engagement with the branches of the bifurcated end 23 as shown to advantage in Figs. 1 and 2 of the drawings.

By providing the spoke 17 with the external screw-threads 22 it will be seen that when the coil spring 19 becomes slack, that the head 20 may be disposed inwardly in the cylinder so as to take up the slack and provide a smooth periphery around the tire of the wheel.

Bracing elements 28 have the opposite ends thereof secured to the inner faces of the plates 24 and the midway portion of each recessed as indicated at 29 so as to insure a positive bracing of the tire on the spokes and at the same time allowing for the proper resiliency in view of the fact that the elements 28 are formed from suitable spring steel so that the same will yield to a certain extent when pressure is exerted on the outer periphery of the tire.

The modification as shown in Fig. 8 discloses the usual tread plate 24 which is of an arcuate configuration and has secured to the outer face thereof a suitable elastic material 30 preferably rubber which will serve to further absorb the shock and is especially adapted for use on vehicles of the lighter type where the pressure exerted on the periphery thereof would not be so great.

In use the springs 19 are inserted in the cylinder 11 and the cap or closure 15 arranged over the top of the open end thereof, and securely held in place by the retaining ring 18 which is provided with cut-out portions at intervals thereon so as to be readily engaged over the cylinder. The head 20 of the spoke 17 is engaged with the outer end of the spring 19 as shown to advantage in Fig. 3, and the spoke 17 extending outwardly through the aperture 16 of the closure 15 so as to allow for the free reciprocation of the head 20 in the cylinder 11 when pressure is exerted on the outer end of the spoke. The spoke 17 is preferably tubular so as to reduce the weight of the tire to a minimum and has the detachable end 23 thereof pivotally engaging the tire 24.

From the above it is obvious that when pressure is exerted on the periphery of the wheel that the heads 20 of the cylinder 11 will be depressed inwardly in the cylinder, and automatically drawn outwardly to their normal position as soon as the pressure is released.

It will be understood that the above description and accompanying drawings comprehend only the general and preferred embodiment of my invention and that various minor changes in details of construction, proportion and arrangement of the parts may be made within the scope of the appended claims and without sacrificing any of the advantages of my invention.

Having thus fully described my invention what I claim as new and desire to secure by Letters Patent is:—

1. A spring wheel including a hub, spokes resiliently associated with said hub, a substantially U-shaped member detachably carried by each of said spokes, a tread comprising a plurality of hinged plates of U-shaped cross-sectional configuration, ears depending from the arms of certain of said plates for pivotal engagement with the arms of said U-shaped members, and a plurality of semi-elliptical springs each of which has a portion midway the ends thereof recessed for engagement with the vertex of each of said U-shaped members, the opposite ends of each of said springs being engaged with the tread plates between the spokes, for absorbing shock occasioned to the tread of said wheel, and preventing lateral thrust.

2. A spring wheel including a hub, cylinders radiating from said hub, bracing means for said cylinders comprising rods arranged on the opposite sides of said cylinders and in parallelism therewith and having the inner ends thereof engaged with said hub, enlarged caps carried by the outer ends of said cylinders and having detachable engagement with said rods, a ring associated with the outer ends of said rods and having engagement with said caps for preventing the displacement of the latter, spokes resiliently mounted in said cylinders, and a tread associated with said spokes and flexible under pressure to operate said spokes in said cylinders.

3. A resilient wheel including a hub, cylinders radiating at intervals from said hub, each of said cylinders being provided with an open outer end, braces arranged in pairs on the periphery of said hub and extending in parallelism to said cylinders, a spring arranged in each of said cylinders, a spoke, a head carried on one end of said spoke for engagement in said cylinder, the opposite end of said spoke extending beyond the outer end of said cylinder and provided with screw-threads, a bifurcated end adapted for screw-threaded engagement on the threaded end of said spoke, a closure for said cylinder, the sides thereof being in engagement with said braces, a ring engaging the upper portions of said closures and being likewise in engagement with said braces, a tire including a plurality of successive plates hingedly mounted together, said tire being provided with depending ears for engagement with the branches of said bifurcated end.

4. A resilient wheel including a hub, cylinders radiating at intervals from the periphery of said hub, a spoke, a head arranged on the one end of said spoke and having engagement in said cylinder, a spring arranged in said cylinder beneath said head adapted to normally hold the same in an outward position, braces radiating from the periphery of said hub in parallelism to said cylinders, a closure for said cylinder, said closure being secured on said cylinder by said braces, the outer ends of said spokes being bifurcated and adjustable, a tire including a plurality of successive plates hingedly mounted together, and a spring brace the opposite ends of which engage the inner periphery of said tire and the midway portion thereof having engagement between the branches of said bifurcated end for the purpose specified.

In testimony whereof I affix my signature in presence of two witnesses.

MARION F. YOUNG.

Witnesses:
 W. H. JEFFRIES,
 E. J. KEYS.

Copies of this patent may be obtained for five cents each, by addressing the "Commissioner of Patents, Washington, D. C."